(12) United States Patent
Murphy, Jr. et al.

(10) Patent No.: US 10,091,440 B1
(45) Date of Patent: Oct. 2, 2018

(54) SYSTEM AND METHOD FOR PROVIDING COMPRESSIVE INFRARED IMAGING

(71) Applicant: LOCKHEED MARTIN CORPORATION, Bethesda, MD (US)

(72) Inventors: Robert J. Murphy, Jr., Kissimee, FL (US); Thomas E. Haberfelde, Clermont, FL (US); Abhijit Mahalanobis, Orlando, FL (US); Robert R. Muise, Oviedo, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 712 days.

(21) Appl. No.: 14/704,440

(22) Filed: May 5, 2015

Related U.S. Application Data

(60) Provisional application No. 61/988,571, filed on May 5, 2014.

(51) Int. Cl.
| | |
|---|---|
| *H04N 5/225* | (2006.01) |
| *G02B 13/16* | (2006.01) |
| *H04N 5/33* | (2006.01) |
| *G06T 7/00* | (2017.01) |

(52) U.S. Cl.
CPC ............ *H04N 5/33* (2013.01); *G06T 7/0079* (2013.01); *H04N 5/2254* (2013.01)

(58) Field of Classification Search
USPC .......................................................... 348/335
See application file for complete search history.

(56) References Cited

U.S. PATENT DOCUMENTS

| | | | |
|---|---|---|---|
| 3,804,976 | A | 4/1974 | Gard |
| H0001354 | H | 9/1994 | Martinez |
| H001354 | H * | 9/1994 | Martinez ..................... 250/330 |
| 5,504,575 | A | 4/1996 | Stafford |
| 5,682,035 | A | 10/1997 | Gallagher et al. |
| 5,828,066 | A | 10/1998 | Messerschmidt |
| 6,128,078 | A | 10/2000 | Fateley |
| 6,495,827 | B2 | 12/2002 | Metcalf |
| 7,532,772 | B2 | 5/2009 | Brady |
| 8,125,549 | B2 | 2/2012 | Dekel |
| 8,186,839 | B2 | 5/2012 | Park et al. |

(Continued)

FOREIGN PATENT DOCUMENTS

| | | |
|---|---|---|
| CN | 1967180 | 12/2010 |
| CN | 103530896 | 1/2014 |
| CN | 103871058 | 6/2014 |

OTHER PUBLICATIONS

Mahalanobis et al., "Efficient Target Detection Using an Adaptive Compressive Imager," Aerospace and Electronic Systems, IEEE Transactions, vol. 50, No. 4, Oct. 2014, pp. 2528-2540.

*Primary Examiner* — Anthony J Daniels
(74) *Attorney, Agent, or Firm* — Terry M. Sanks, Esq.; Beusse Wolter Sanks & Maire, PLLC

(57) ABSTRACT

A system is disclosed that includes a detector and a combination of lenses and mirrors as imaging optics configured to provide for block by block compressive sensing of an imaged scene with the block by block determined by a plurality of shift-invariant masks to produce an image of the scene of the detector. A resolution of the image through the combination of lenses and mirrors is provided at the detector greater than a resolution capability of the detector at the detector. Another system and a method are also disclosed.

18 Claims, 10 Drawing Sheets

(56) References Cited

U.S. PATENT DOCUMENTS

| | | | |
|---|---|---|---|
| 8,199,244 B2* | 6/2012 | Baraniuk | H04L 25/20 |
| | | | 348/335 |
| 8,570,406 B2 | 10/2013 | Kelly et al. | |
| 8,610,074 B2 | 12/2013 | Nogueira-Nine | |
| 8,704,912 B2 | 4/2014 | Miyawaki | |
| 8,717,466 B2 | 5/2014 | Baraniuk et al. | |
| 2003/0057374 A1 | 3/2003 | Schuebel et al. | |
| 2012/0241597 A1 | 9/2012 | Bridge et al. | |
| 2013/0070138 A1 | 3/2013 | Baraniuk et al. | |
| 2013/0128042 A1 | 5/2013 | Bridge et al. | |
| 2013/0201343 A1 | 8/2013 | Jiang et al. | |
| 2013/0228692 A1 | 9/2013 | Larsen | |
| 2015/0003738 A1* | 1/2015 | Bernal | G06T 11/003 |
| | | | 382/195 |

\* cited by examiner

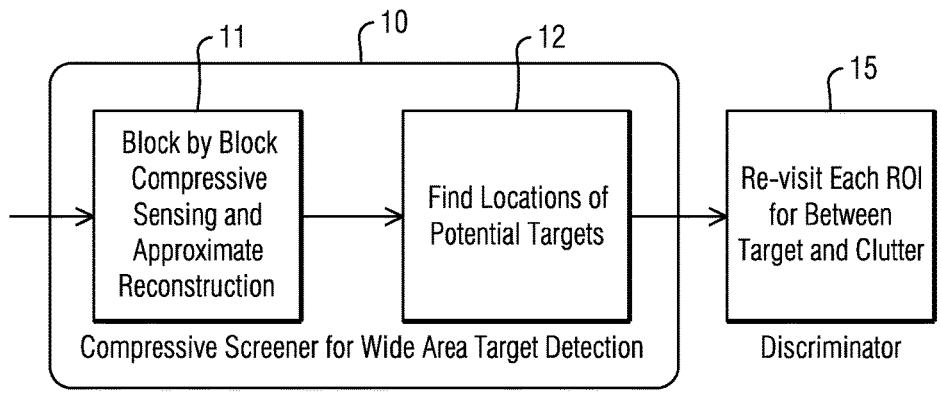
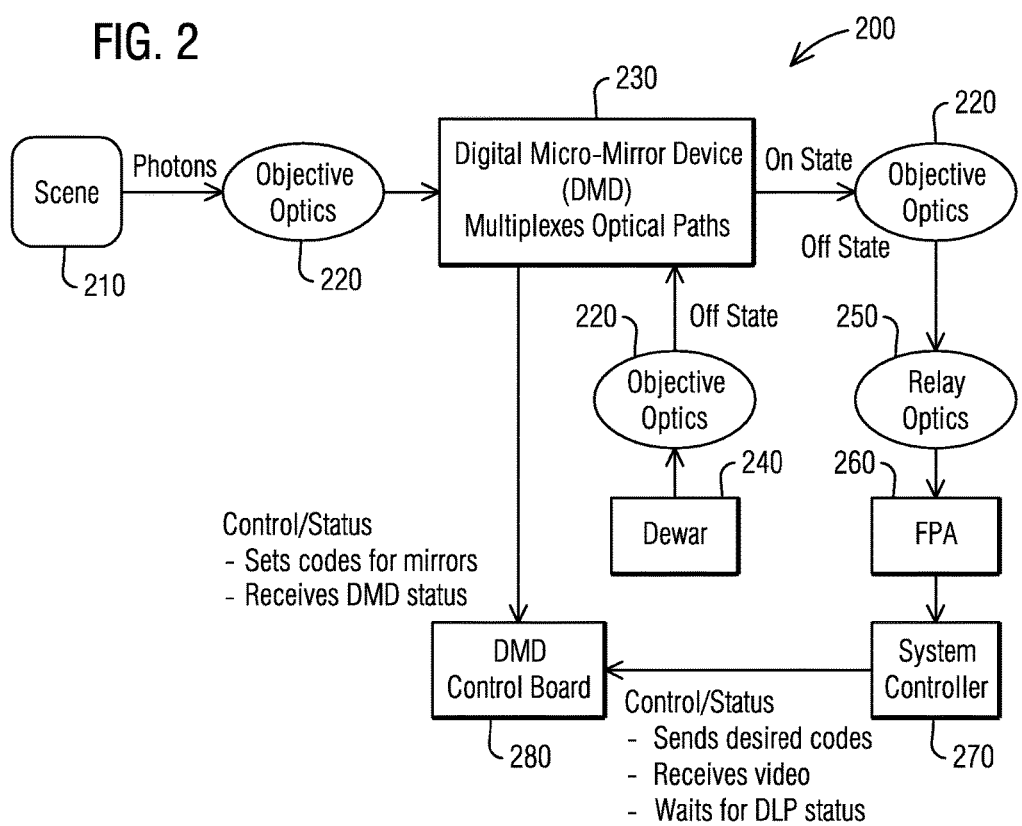

FIG. 6

Input:
$\Phi \in \mathbb{R}^{M \times N}$
$g: \mathbb{R}^N \to \mathbb{R}^N$
$I > 0$
Output:
$\hat{\Phi} \in \mathbb{R}^{M \times N}$

Algorithm:
$\hat{\Phi} \leftarrow \emptyset$
$\tilde{\Phi} \leftarrow \Phi$
for $m \leftarrow 1$ to $M$
    $u \leftarrow \text{getLargestPrincipalComponent}(\tilde{\Phi})$
    $\Omega \leftarrow \{g(\alpha_i u + \beta_i)\}_{i=1}^{I}$ where $\alpha_i \sim N(1, \sigma_\alpha^2)$ and $\beta_i \sim N(0, R_\beta)$
    $\hat{u} \leftarrow \arg\min_{\tilde{u} \in \Omega} \|u - \tilde{u}(\tilde{u}^T \tilde{u})^{-1} \tilde{u}^T u\|$
    $\hat{\Phi} \leftarrow [\hat{\Phi}; \hat{u}]$
    $\tilde{\Phi} \leftarrow (I - \hat{u}(\hat{u}^T \hat{u})^{-1} \hat{u}^T) \tilde{\Phi}$
return $\hat{\Phi}$

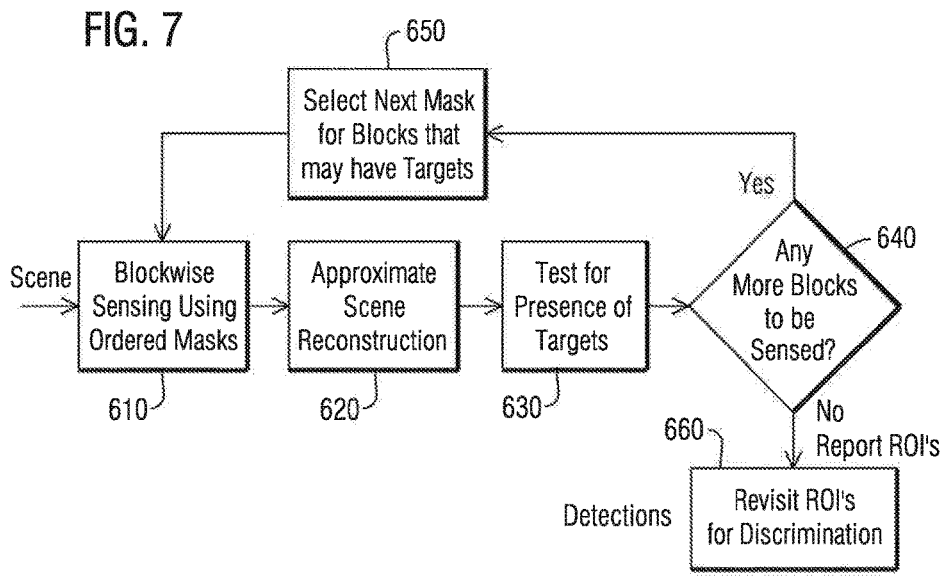

FIG. 7

SYSTEM AND METHOD FOR PROVIDING COMPRESSIVE INFRARED IMAGING

CROSS-REFERENCE TO RELATED APPLICATIONS

This application claims the benefit of U.S. Provisional Application No. 61/988,571 filed May 5, 2014, and incorporated herein by reference in its entirety.

BACKGROUND

Embodiments relate to compressive sensing and, more particularly, to a system and method for providing a high resolution infrared image from a low resolution infrared detector array with compressive sensing.

Target detection systems are generally used to determine a location of a potential target in a field of view of a sensor. Traditionally, this is accomplished with high quality images generated by a conventional imager. However, when a wide field of view is intended, this can pose a challenge for data acquisition due to very high bandwidth requirements. For capturing images in the infrared spectrum, systems have been developed. However, such systems have been found to have a high size, weight and power (SWaP) requirement as well as cost. This is because such systems typically require not only large infrared focal plane arrays, but also large cooling systems to cool the arrays.

Manufacturers and users of target detection systems would benefit from a system and method which provides for target detection where SWaP is reduced.

SUMMARY

Embodiments relate to a system and method to acquire a high resolution image from a low resolution detector array by using compressive sensing. The system comprising a detector and a combination of lenses and mirrors as imaging optics configured to provide for block-by-block compressive sensing of an imaged scene with the block by block determined by a plurality of shift-invariant masks to produce an image of the scene on the detector. A resolution of the image through the combination of lenses and mirrors is provided at the detector greater than a resolution capability of the detector at the detector.

Another system comprises a spatial light modulator ("SLM") configured with a plurality of mirrors. An objective lens configured to form an image of a scene on the spatial light modulator is also provided. An infrared detector, comprising a detection array and a Dewar, wherein the detection array has a lower resolution capability than a resolution capability of the spatial light modulator is also disclosed. A relay lens configured to relay light from SLM to detector is also included. An image on the spatial light modulator is optically relayed to the infrared detector. The spatial light modulator is further configured to activate the plurality of mirrors of the spatial light modulator using compressive sensing to at least one of a reflective state and a non-reflective state to control reflectivity of at least one mirror of the plurality of mirrors so that at least one mirror in the reflective state reflects a first segment of the image to the detection array of the infrared detector and at least one mirror in the non-reflective state reflects a second segment of an image of the Dewar onto the infrared detector.

The method comprises forming an image of a scene onto a spatial light modulator through an objective lens. The method also comprises activating a plurality of mirrors of the spatial light modulator with compressive sensing to an on-state and an off-state to control reflectivity of at least one mirror of the plurality of mirrors so that at least one mirror in the on-state reflects a first segment of a plurality of segments of the image to a detection array of an infrared detector and at least one mirror in the off-state reflects an image of a Dewar onto an infrared detector. The method also comprises applying compressive sensing to control the state of the at least one mirror of the plurality of mirrors of the spatial light modulator to form the image at the detection array with a resolution greater than the resolution capability of the detection array.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1 shows a block diagram of an embodiment of a two-stage compressive target detection process;

FIG. 2 shows a block diagram of an embodiment of a compressive imaging system;

FIG. 6 shows an embodiment of an algorithm;

FIG. 7 shows an embodiment of a flowchart depicting a method of a compressive adaptive sensing algorithm;

DETAILED DESCRIPTION

Figure 3:
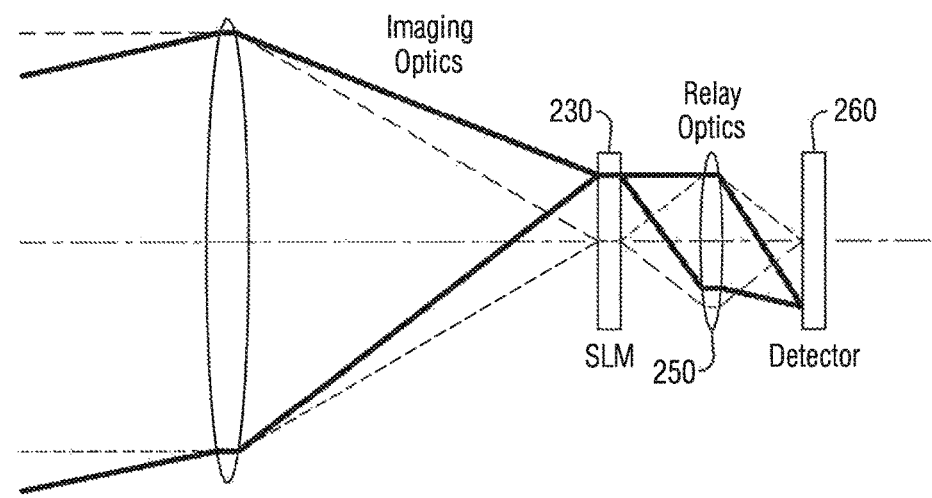
FIG. 3 shows a block diagram of an embodiment of an optics system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein.

The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 shows a block diagram of an embodiment of a two-stage compressive target detection process. Compressive sensing involves a signal processing technique for acquiring and reconstructing a signal, such as by finding solutions to underdetermined linear systems. As illustrated, a compressive screener for wide area target detection is provided 10 in two parts. A first part 11 provides for a block by block compressive sensing of a scene being performed such as, but not limited to, in small/segmented contiguous blocks. All blocks may be captured in parallel resulting in accelerated formation of an image of the entire area. A set of shift-invariant masks may be used.

A determination, or finding locations, of potential regions of interest (ROI or potential targets is next completed in a second part 12. Determination of ROI may be completed with a target detection algorithm. Since the compressive screener process may still identify some clutter as ROIs, a discriminator 15 may be needed. Therefore, once both parts of the compressive screener step are complete, at the discriminator 15, or in a discrimination step, each ROI may be revisited to discriminate between a potential target and clutter. More specifically, the discriminator may provide for revisiting ROIs to make new localized measurements and analyzing the measurements to distinguish between target and clutter. Thus, as illustrated, both sensing and processing strategies are integrated which may result in an adaptive approach where sensing only occurs in regions of a scene where current measurements indicate a potential for a target to exist. This will lead to a reduction in a number of measurements required to perform target detection task.

Considerations for designing masks for the initial search process using the compressive screener and the subsequent discrimination stage are inherently different. Since the locations of the targets are not known a-priori, the masks used for searching may be shift-invariant. More specifically, the value of the measurement cannot depend on a position of the target in the scene. Each mask may contain as much information about the target as possible so that a number of measurements required to find all targets remains small. One solution for this is to choose the masks to be eigenvectors of the correlation matrix of all shifted versions of the images of the targets. For discrimination, however, an assumption may be made that the objects are centered in the search window (since the ROI is provided by the screener), and that the goal is to maximally separate the targets from clutter.

Although different choices are possible to establish the mask, a non-limiting example is Fukunaga Koontz transform (FKT) which provides masks that are well suited for a two-class discrimination task. The FKT ensures that masks that contain the most information about the targets may also contain the least information about the clutter space, and vice versa. Based on this rationale, an adaptive compressive sensing scheme that first uses the compressive screener shift-invariant basis functions for finding locations of potential targets, and then applies the FKT for discriminating between target and clutter at the ROIs to achieve overall high probability of detection with a low false alarm rate.

Since measurements may be made using several vectors, a spatial light modulator (SLM) such as, but not limited to, a digital micromirror device (DMD), may be provided to electronically sequence through all the necessary masks. The SLM is an array of electronically addressable opto-electronic or electro-mechanical elements (either transmissive or reflective) which can modulate the intensity of the light in proportion to the values of the mask. In a single pixel camera (SPC), the scene may be optically focused on the SLM. The SLM may weigh, or evaluate, intensity at every point in accordance with the values encoded in the mask. The modulated light reflecting from the SLM may then be re-focused and collected on a single detector (or pixel) whose output is equivalent to the compressive measurement of the scene mad using the mask. Thus, the SPC maps all points in the scene to one detector, weighted by the corresponding elements of the mask. The terms DMD and SLM may be used interchangeably herein.

FIG. 2 shows a block diagram of an embodiment of a compressive imaging system. A scene 210 is imaged where the image passes through an optical objective lens group, or objective lens 220 of the system 200. Though the term "objective lens" is used herein, this term is not limited to mean a singular lens, but is used to also identify an objective lens group which may include more than a singular lens. A spatial light modulator 230, such as, but not limited to, a DMD is provided. A Dewar 240 is provided. As a non-limiting example, the Dewar may be a liquid nitrogen filled, refrigerated Dewar, etc. An optical relay group lens 250, or relay optics, may be provided. An array detector 260, such as, but not limited to, a focal plane array ("FPA") detector may be provided. The detector 260 may be a camera with fold mirrors, as explained in further detail below. A controller 270 which controls a DMD controller 280 or controller board, may also be provided.

In an embodiment, the optical objective lens group 220 may have three separate apertures as illustrated by showing three objective lenses 220 in FIG. 2. In operation, an optical path travels through a first path of the optical objective group 220 and focuses onto the DMD 230. The DMD 230 may modulate the light by a specified set of patterns and reflects, when certain mirrors of the DMD 230 are turned on, or are in an on-state or are in a reflective state or imaging state, back through a second path of the optical objective lens. The second optic path then goes to the relay lens group 250, which may include a relay-to-objective fold mirror, illustrated in FIG. 10, and travels through the optical relay group 250 and onto the detector array 260 for detection. Similar to the discussion of the objective lens group, such a group may comprise a singular lens or a plurality of lenses, wherein the term "relay lens" is used herein to define both the relay lens as a singular and a plurality of lenses. The mirrors of the DMD 230 that are turned off (or are in a non-reflective state) may reflect the line-of-sight of the relay-to-objective group at a third path on the objective lenses 220 and onto the liquid nitrogen filled Dewar 240 as a thermal reference.

Thus, when the DMD 230 is in an off-state or non-reflective state, the light is directed through the objective optics of the objective lens group 220 of the Dewar 240. In another embodiment the objective lens group 220 may comprise separate lenses.

FIG. 3 shows a block diagram of an embodiment of an imaging optics for compressive sensing. As illustrated, in general, an image passes through a lens which focuses the image onto the SLM 230. The image is then directed to the relay optics 250, which may be provided between the SLM 230 and the detector 260. The image is then directed the detector 260.

Figure 4:
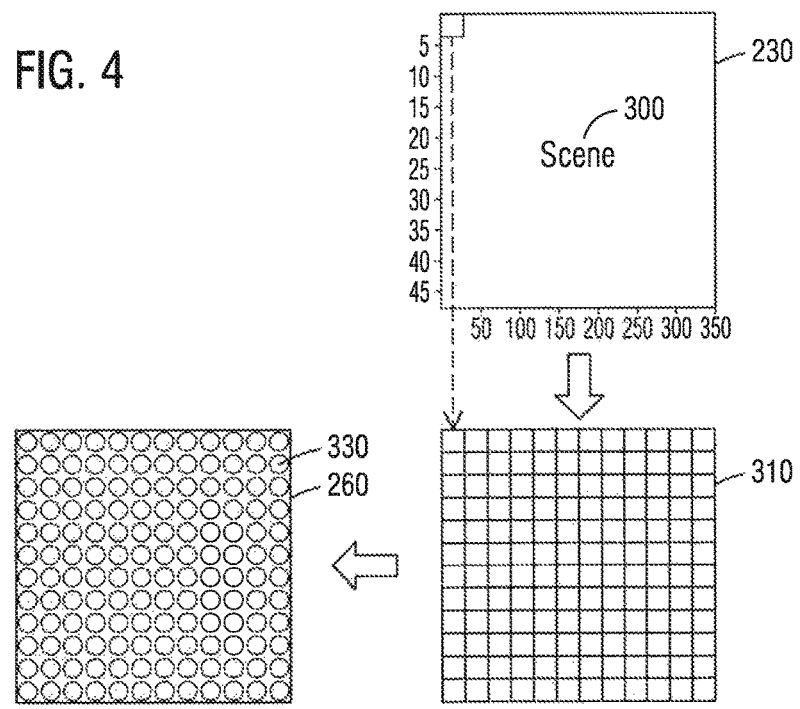
FIG. 4 shows an embodiment for compressive sensing.

FIG. 4 illustrates an embodiment for compressive sensing using the imaging optics of FIG. 3. More specifically, FIG. 4 illustrates how the SPC may be generalized to sense very large scenes in smaller blocks using a large SLM 230. As illustrated, a scene 300 is optically imaged on the SLM 230. A mask 310 may be repeated across the SLM 230 where each block of the mask 310 may comprise a different segment of the scene 300. Separate sections of the scene 300 may be imaged on different blocks on the SLM. Each region of the scene may be weighted by a code of the same size at the SLM 230, the SLM. The SLM 230 may be partitioned into many contiguous blocks of elements, and each block may be dedicated to sensing a corresponding region of the scene 300. As a non-limiting example, consider a 4096× 2048 scene that must be compressively sensed using an SLM of the same size. A coded version is then re-imaged on the detector array 260. The re-imaging optics may be such that light from one such coded block is collected on a single element of the detector array. However, the detector 260 may have a lesser resolution capability than the SLM 230.

In this non-limiting example, the scene is partitioned in 128×64 blocks, each of size 32×32 SLM elements. The masks are also of size 32×32, and repeated across the surface of the SLM 230. As the SLM 230 cycles though all the masks, each block of the scene 300 is sensed by the same mask 310 at any given time. A step of the process re-images the SLM 230 such that each 32×32 block is captured by a single detector element 330. This implies that the detector 360 in this non-limiting example is an array of 128×64 elements, and significantly smaller than the original scene. Specifically in this non-limiting example, the number of detector elements is 1000 times less than the number of pixels to be sensed. Even if 50 masks were used for making as many measurements in each block, the overall number of measurements is still 20 times fewer than the number of pixels to be recovered.

The approach illustrated in FIG. 4 may provide for mapping the full scene to blocks, each of which is mapped to a separate detector element 330. The explanation above provides for more pixels than a conventional imager, but avoids the problems associated with imaging large areas with the SPC. The embodiment illustrated herein may be used to implement an adaptive compressive sensing system and method for wide area target detection. The systems and methods disclosed may detect targets using few measurements when compared to a number of pixels in an image.

The scene may be processed in blocks that are large enough to contain the target, but of manageable dimensionality motivated by computational considerations. As a non-limiting example, let x be a vector that represents a block of the image with correlation matrix $R_x=E\{xx^T\}$, and P be a matrix whose columns are the eigenvector of $R_x$. Then a=Px are the measurements on the basis defined by the eigenvectors. It should be noted that if x were a zero-mean process, then $R_x$ is the same as the covariance matrix, and the columns of P are the same as the principle components of the space. In general, however, the mean is non-zero, and therefore the basis obtained using the correlation matrix is used for representing the signal. In the absence of noise, x can be easily reconstructed as $x=P^T a$. In practice, however, measurements are noisy and given by:

$$U=Px+v$$

where v is the corrupting noise vector with zero mean and covariance $R_v=E\{vv^T\}$. Using a linear operator W such that $\hat{x}=Wu$ is the minimum mean square error (MMSE) estimate of x, where $W=R_x P^T[PR_x P^T+R_v]^{-1}$. This would minimize the error:

$$MSE=E\{|x-\hat{x}|^2\}=E\{|x-Wu|^2\}.$$

Then, to achieve shift-invariance, an estimate of Rx over all possible shifts (positions) of the target within the image frame may be made. Specifically, Rx may be estimated using the ensemble of all vectors obtained by linearly shifting every target image to all possible positions. It should be noted that for some shifted version, the targets will be only partially contained in the image. This is consistent with the possibility that a target may lie over two or more adjacent blocks in the architecture shown herein, and only partially contained within each. The estimation process may lead to a block Toeplitz structure, such as, but not limited to, a shift-invariant structure, for the correlation matrix, and ensures that the projection of the targets on the eigenvectors will not be affected by their position within the scene.

Figure 5A:
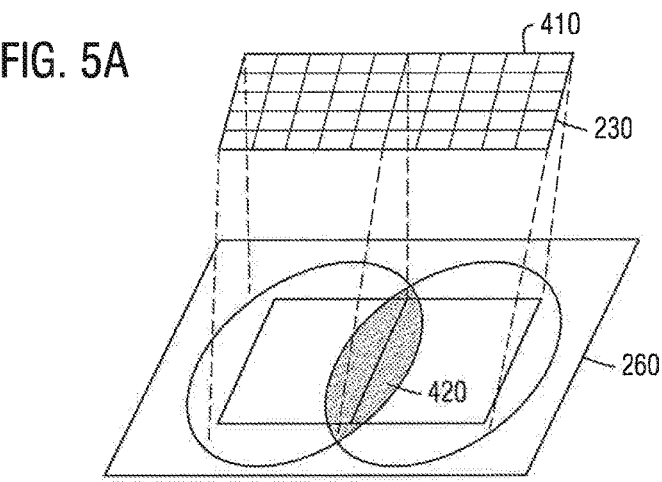
FIGS. 5A-5D show an embodiment of a cross talk interference when a segment of an image is detected by more than one mirror of a detector array.
Figure 5B:
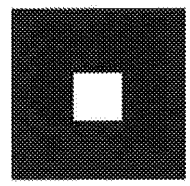

Non-limiting examples of some typical target images (in a blocks of size 20×40 pixels) are shown in FIG. 5A along with the shift-invariant masks in FIG. 5B. It should be noted that the masks (also of size 20×40) are sinusoidal in intensity, which results from the Toeplitz structure and ensures shift-invariant projection measurements. The first 4 rows are the strongest eigenvectors whereas the last 4 rows are the weakest of the selected masks.

Figure 5C:
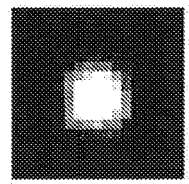
Figure 5D:
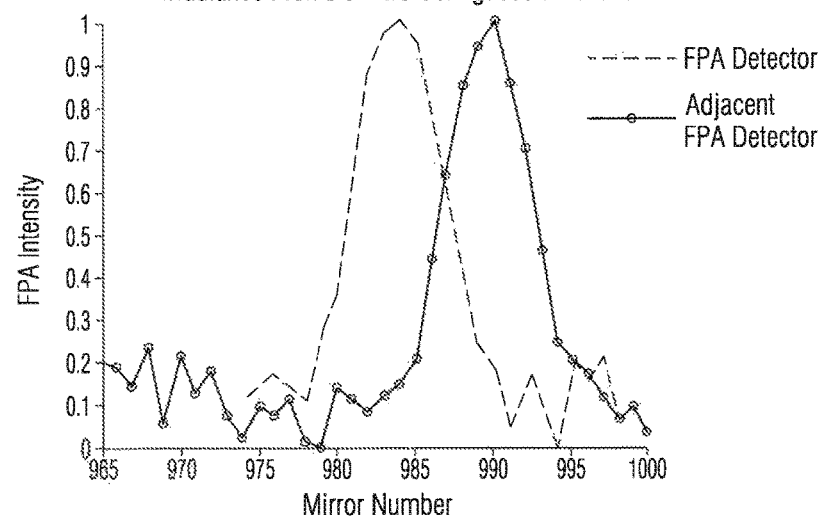

As a non-limiting example, given the geometry of an imaging system, such as, but not limited to, which is illustrated in FIG. 3, each of the 256×320 pixels on the FPA 260 typically approximately detects 6×6 mirrors on a 1080× 1920 DMD 230. As a way to measure this irradiance between each mirror of the DMD 230 to each detector of the FPA 260, a rasterization procedure may be employed on a uniformly lit black body infrared (IR) scene. The result is a contribution from each of the N mirrors to each of the L detectors:

$$C = \begin{pmatrix} c_1^T \\ c_2^T \\ \vdots \\ c_L^T \end{pmatrix} \in \mathbb{R}^{L \times N},$$

where L=256*320, and N=1080*1920. $[C]_{i,j}$ is the irradiance between the $l^{th}$ FPA detector and the $j^{th}$ DMD mirror. Since an FPA detector is contributed from only 6×6 mirrors the structure of C is sparse. However, some image segments are detected by more than one mirror 410 as illustrated in FIGS. 5A-5D. FIG. 5A shows mirrors producing cross talk interference 420 based on two interfering detectors 260. FIG. 5B shows a result of an ideal mirror arrangement contributing to the detector 260. FIG. 5C shows measured irradiance showing roll off beyond ideal support from mirrors. FIG. 5D shows an irradiance profile of two contiguous detectors with cross talk interference 420 considering detector intensity versus a number of mirrors.

FIG. 6 shows an embodiment of an algorithm. The calibration data discussed above may be included into compressive sensing model or algorithm. If the signal to estimate, $x \in \mathbb{R}^N$, were measured by $\Phi \in \mathbb{R}^{M \times N}$, then the M measurements are:

$$y = \Phi x \in \mathbb{R}^M.$$

With a one-pixel camera, one DMD code yields one measurement value. However, with a multi-aperture CI system, one DMD code gives L measurements, and each detector weighs x by their respective irradiance. The spatial locality of each detector's irradiance on the DMD can be used to split $\Phi$ into separate smaller systems. So, the number of variables per system is the number of contributing mirrors to the detector with the number of systems equal to the number of detectors (L). If the $i^{th}$ DMD code were $b_i \in \{0, 1\}^N$, then the $l^{th}$ detector on the FPA is measured precisely by:

$$\Phi_l = \begin{pmatrix} (b_1 \circ c_l)^T \\ (b_2 \circ c_l)^T \\ \vdots \\ (b_M \circ c_l)^T \end{pmatrix} \in \mathbb{R}^{M \times N} \; l = 1 \ldots L,$$

where $\circ$ is the Hadamard product. Due to the small support of the irradiance, only a few columns of $\Phi_l$ are non-zero vectors, so the column dimensions of each system can be significantly reduced before reconstruction. Accounting for roll off, each $\Phi_l$ reduces to around 50 variables and about half of the entries of $b_i$ are one. These linear systems are separable and can be solved in parallel making its computation more tractable. However, the cross talk interference present may now estimate some of the pixels more than once. In most cases the zero entry in the calibration data will nullify any estimate in these pixels. In total there are L estimates of x and most of the values are zero. As a way to stitch these estimates together we use the irradiance of all the detectors again in a second stage of our estimation process. That is, if $\hat{x}_l$ were an estimate to $y_l = \Phi_l x$, then we have L estimates for the $j^{th}$ pixel of x, which is given by:

$$\begin{pmatrix} [\hat{x}_1]_j \\ [\hat{x}_2]_j \\ \vdots \\ [\hat{x}_L]_j \end{pmatrix} = \begin{pmatrix} [c_1]_j \\ [c_2]_j \\ \vdots \\ [c_L]_j \end{pmatrix} [x]_j \quad j = 1 \ldots N.$$

A least-squares solution gives an estimate to $[x]_j$ and the process may be repeated over all the pixels, denoting this final solution as $\hat{x}$.

It remains to solve each of the systems, $$y_l = \Phi_l x \; l = 1 \ldots L.$$

Instead of finding an estimate that minimizes an L1 norm for a coefficient vector in some basis an additional prior may be applied using training imagery used from flyover applications. Covariance matrices estimates may be synthesized based on the Columbus large image format (CLIF2007) mainly because they are expected to be similar to the statistical properties in future test imagery. The signal covariance of x may be denoted as $R_x \in \mathbb{R}^{N \times N}$. Since noise level may be characterized, the noise covariance based on the noise level may be a function of both the temperature and percentage of mirrors turned on. The additive measurement noise, denoted as $v \in \mathbb{R}^M$, may be identical and independently distributed over all the FPA detectors so that its covariance is:

$$R_v = \text{diag}(\sigma_v^2) \in \mathbb{R}^{M \times M}.$$

Using these statistical priors, a weighted least squares operator may be constructed for each detector as:

$$W_l = R_x \Phi_l^T (\Phi_l R_x \Phi_l^T + R_v)^{-1} \; l = 1 \ldots L.$$

Note, since N is now smaller per system (~50 variables) and using the relationship, M=

$$O\left(K \log\left(\frac{N}{K}\right)\right),$$

where K is the number of nonzero coefficients of the basis vector, M may also be made smaller so that the matrix inversion is tractable. Otherwise with one entire system, it may not be feasible to invert the compositions of the entire covariance matrix with a DMD size as N=1080*1920.

In designing the binary codes, $b_i$, an optimality criterion may be used that maximally separated the basis vectors or atoms of a dictionary under measurement so that different features in the imagery may be distinguished to an observer. However, any optimal code may not be feasible to produce a measurement matrix on the sensing device. Especially on an array of micro-mirrors, binary values as the measurement matrix likely will be problematic for expressing randomized matrices. To overcome this, a stochastic algorithm may be introduced that constrains an originally unrestrictive set of measurements, $\Phi$, to device constraints as a way to produce feasible ones, $\hat{\Phi} \in \mathbb{R}^{M \times N}$. Using a greedy approach, the greatest principal component of the measurement kernel is randomly perturbed several times and mapped by device constraints, $g: \mathbb{R}^N \to \mathbb{R}^N$. If $\varphi \in \mathbb{R}^N$ is one of the unrestrictive measurements from one of the M rows in $\Phi$, then it may map to:

$$g(\varphi) = \begin{bmatrix} \text{sign}([\varphi]_1) \\ \text{sign}([\varphi]_2) \\ \vdots \\ \text{sign}([\varphi]_N) \end{bmatrix}.$$

This generates a candidate set of feasible measurements. The principal component may then be projected onto the column space of each of these candidates. The closest candidate is selected to be the estimate of this principal component. This estimate is then subtracted off from the measurement kernel and the steps are repeated, as the algorithm is given in FIG. 6.

FIG. 7 shows an embodiment of a flowchart of a compressive adaptive sensing algorithm. As illustrated, block-wise sensing is applied, at 610. Approximate scene reconstruction occurs, at 620. A test for presence of at least one target occurs, at 630. If determination is made whether more blocks are to be sensed, at 640, the next block is selected for sensing, at 650. If no further blocks are to be sensed, at 640, the ROIs are revisited for discrimination, at 660. Detection then occurs.

Essentially, the process is initialized by making a first measurement in all blocks. An embodiment of an algorithm may be of a form of sequential hypothesis testing where a test statistic may be used at each step to determine a presence or absence of a target. Each new measurement made at each step adds more detail to the partially reconstructed image in regions where targets may be present. A method for ordering the masks so that most important ones are used first is provided. This measurement is used to reconstruct the corresponding block, and the entire scene is reconstructed in this manner. This, results in more reliable results to ascertain whether a target is present or not at a given location. Thus, measurements for image reconstruction are then made only in promising regions of the scene.

Figure 8:
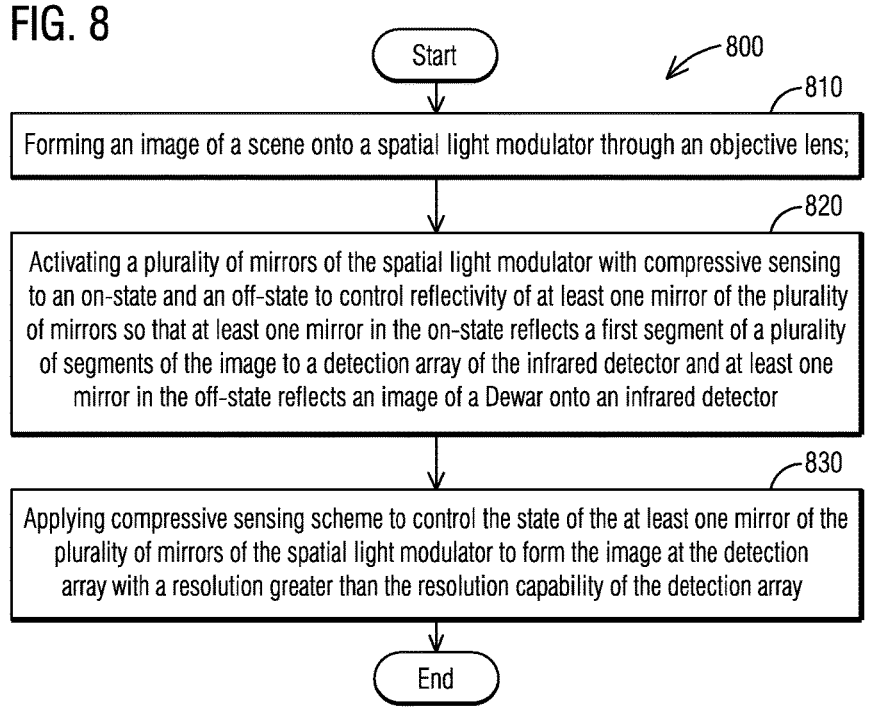
FIG. 8 shows an embodiment of a flowchart depicting another method using compressive adaptive sensing.

FIG. 8 comprises a flowchart illustrating an embodiment of another method. The method 800 comprises forming an image of a scene onto a spatial light modulator through an objective lens, at 810. The method 800 further comprises activating a plurality of mirrors of the spatial light modulator with compressive sensing to an on-state and an off-state to control reflectivity of at least one mirror of the plurality of mirrors so that at least one mirror in the on-state reflects a first segment of a plurality of segments of the image to a detection array of the infrared detector and at least one mirror in the off-state reflects an image of a Dewar onto an infrared detector, at 820. The method also comprises applying a compressive sensing scheme to control the state of the at least one mirror of the plurality of mirrors of the spatial light modulator to form the image at the detection array with a resolution greater than the resolution capability of the detection array, at 830.

Based on the information provided above, the detector 260 may be provided in the midwave or mid-range, infrared range wherein a DMD is used encode the light. The midwave infrared spectral range is defined here as a wavelength range of about 3.0 to about 5.2 microns, plus or minus 1 micron. The longwave infrared spectrum is defined by the wavelength range of about 7.5 to about 12.0 microns, plus or minus 1 micron. To operate in the midwave infrared range, the optics may be designed such that they work with the angle the mirror elements reflect in the "on" and "off" states such as, but not limited to, approximately 24 degrees where the term "approximately" provides for a change of by about 1 degree either positively or negatively. To minimize the signal level from the "off" mirrors, the system may be designed to point them towards the Dewar, presumably a cold Dewar.

This system may also be designed to work in the longwave infrared spectrum by replacing the Midwave infrared detector array, with a longwave infrared detector array, and designing the optical system the same way using infrared transmitting materials that transmit in the longwave infrared spectrum.

Figure 9:
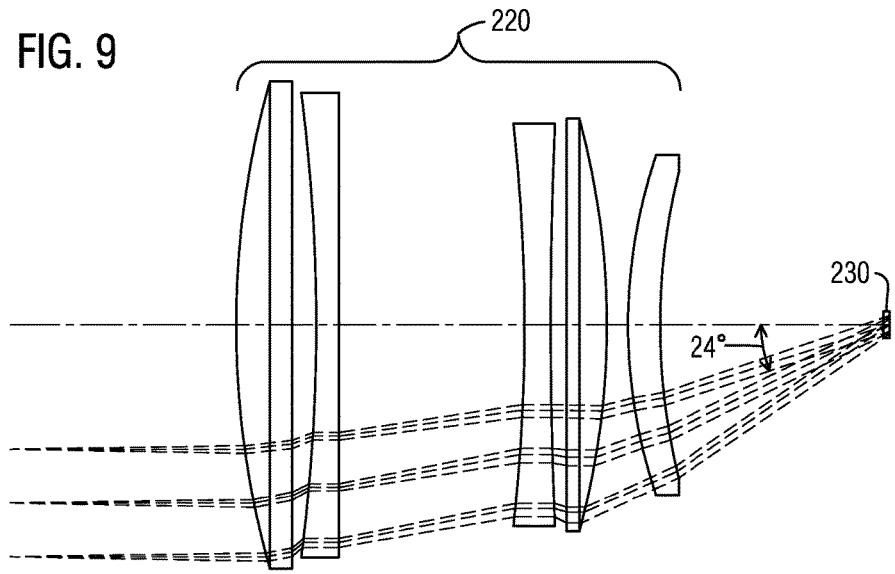
FIG. 9 shows an objective lens as described herein.

FIG. 9 shows an objective lens group as described herein. To image off the DMD 230, at the DMD mirror array, with good image quality, an image may be formed on a flat image plane at an angle-of-incidence of 24 degrees to the image plane. This may be accomplished using the objective lens group 220 that is corrected over a large enough aperture such that the line-of-sight is off-centered from the optical centerline of the objective lens by a distance that causes the center of the field-of-view to focus at an angle of 24 degrees to the image plane. In addition, every point in the field-of-view may image onto the DMD mirror array at an angle of 24 degrees. To accomplish this, the objective lens group 220 may be designed to be telecentric. Telecentric is generally known by those knowledgeable in the art to mean that the chief ray from every point in the object is incident on the image plane parallel to the optical centerline. What is not commonly known by those knowledgeable in the art is that by designing the objective lens group 220 to be telecentric for a centered aperture, if the aperture is decentered from the centerline, the chief ray from every point in the field-of-view will be parallel to each other, but all at an angle with respect to the optical centerline. Therefore, by designing the objective lens group 220 to be telecentric, and by determining the appropriate off-center distance, the image is formed on a flat image plane at an angle of 24 degrees and the chief ray from every point in the field-of-view.

Figure 10:
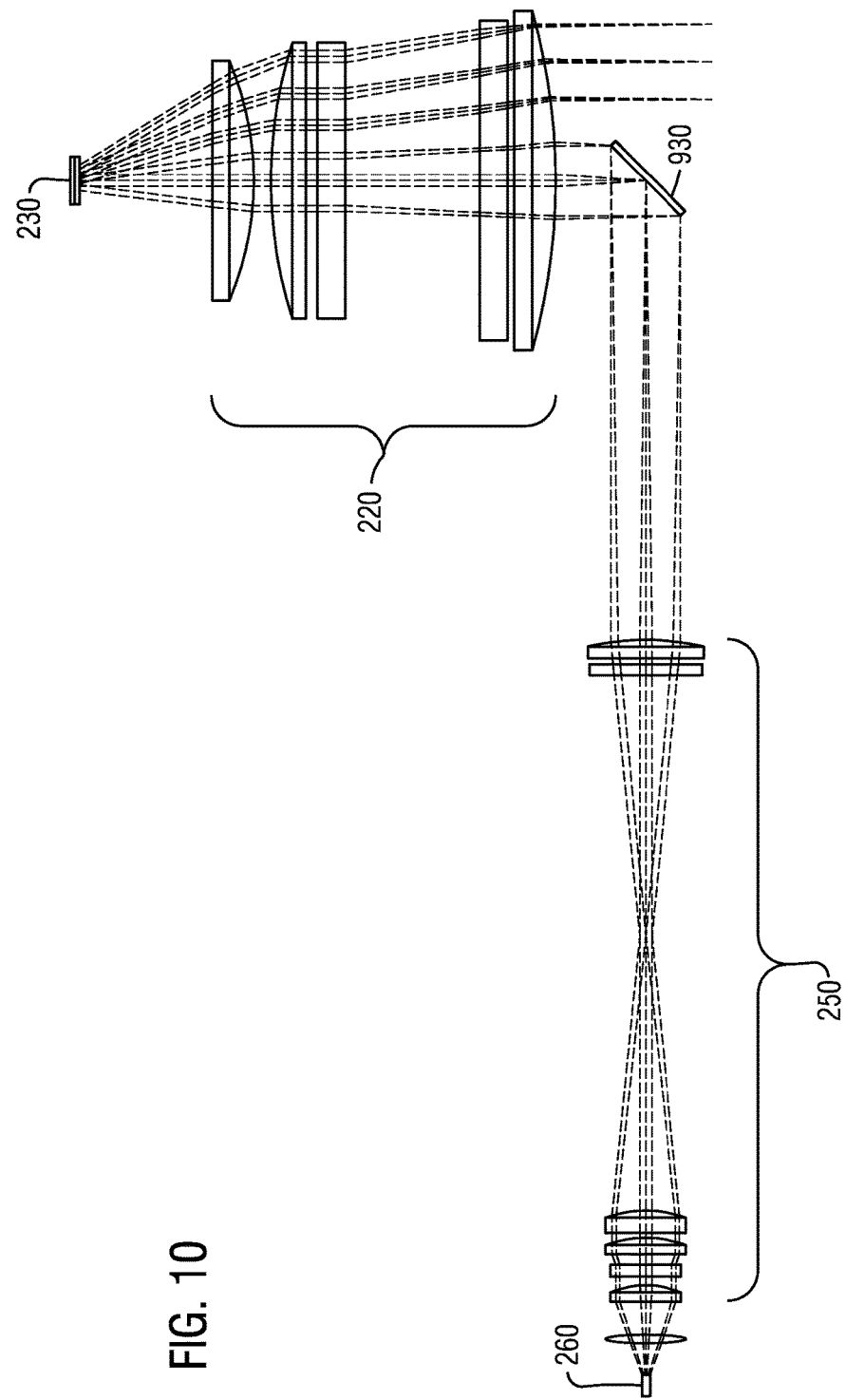
FIG. 10 shows an embodiment of a DMD in an imaging state.

FIG. 10 shows a DMD 230 in an on or imaging state. As illustrated, the DMD mirror array in the "on" state, reflective state, or imaging state, may tilt at approximately 12 degrees reflecting the image relayed from the FPA 260 at approximately 25 degrees back through the objective lens group 220 to object space.

Figure 11:
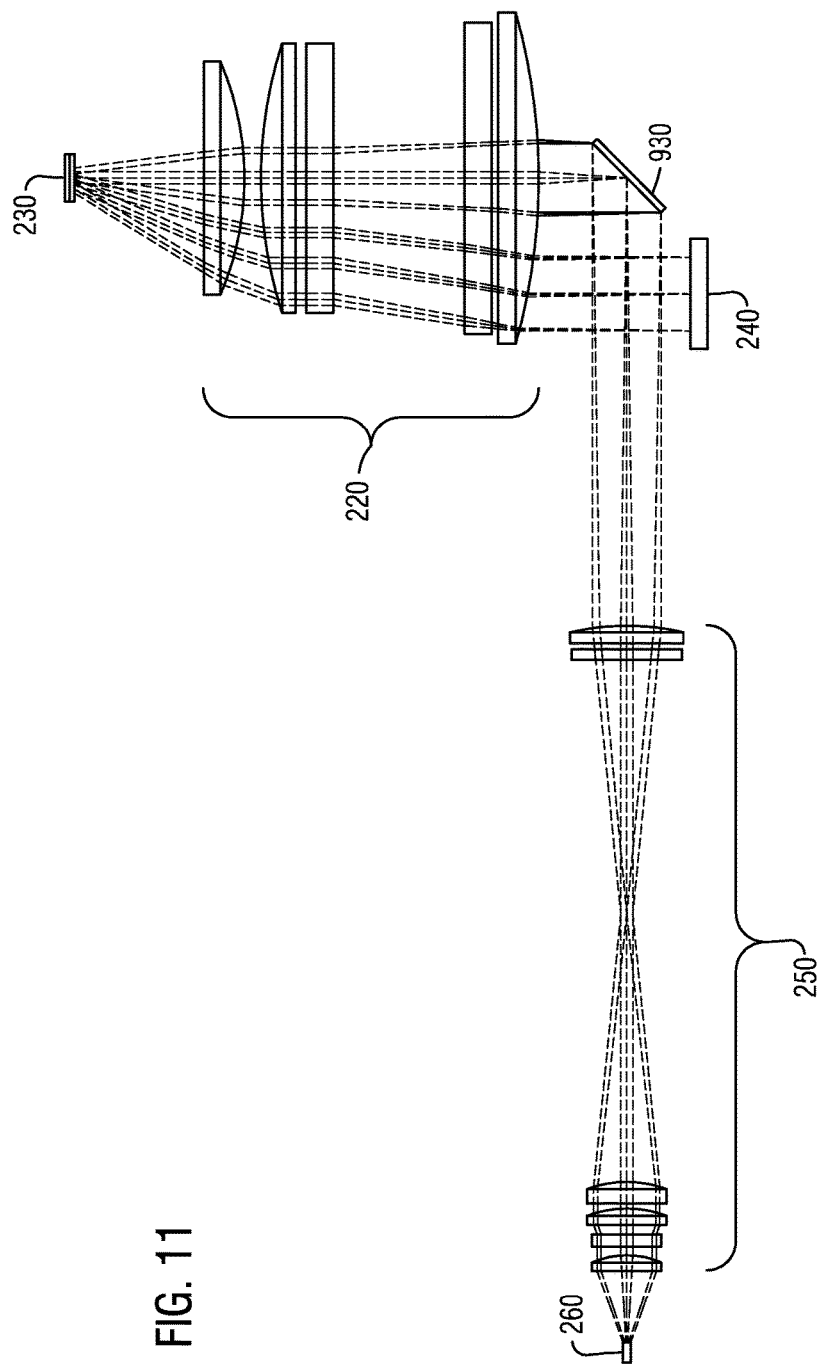
FIG. 11 shows an embodiment of a DMD in a non-imaging state.

FIG. 11 illustrates the DMD mirrors in an off or non-imaging state. As illustrated, the DMD mirrors in the "off" state, non-imaging state, or non-reflective state tilt at approximately −12 degrees reflecting the image relayed from the FPA at approximately 24 degrees back through the objective lens group 220 to the Dewar 240, wherein the Dewar 240 may comprise, but is not limited to, a cold plate having liquid nitrogen.

Figure 12:
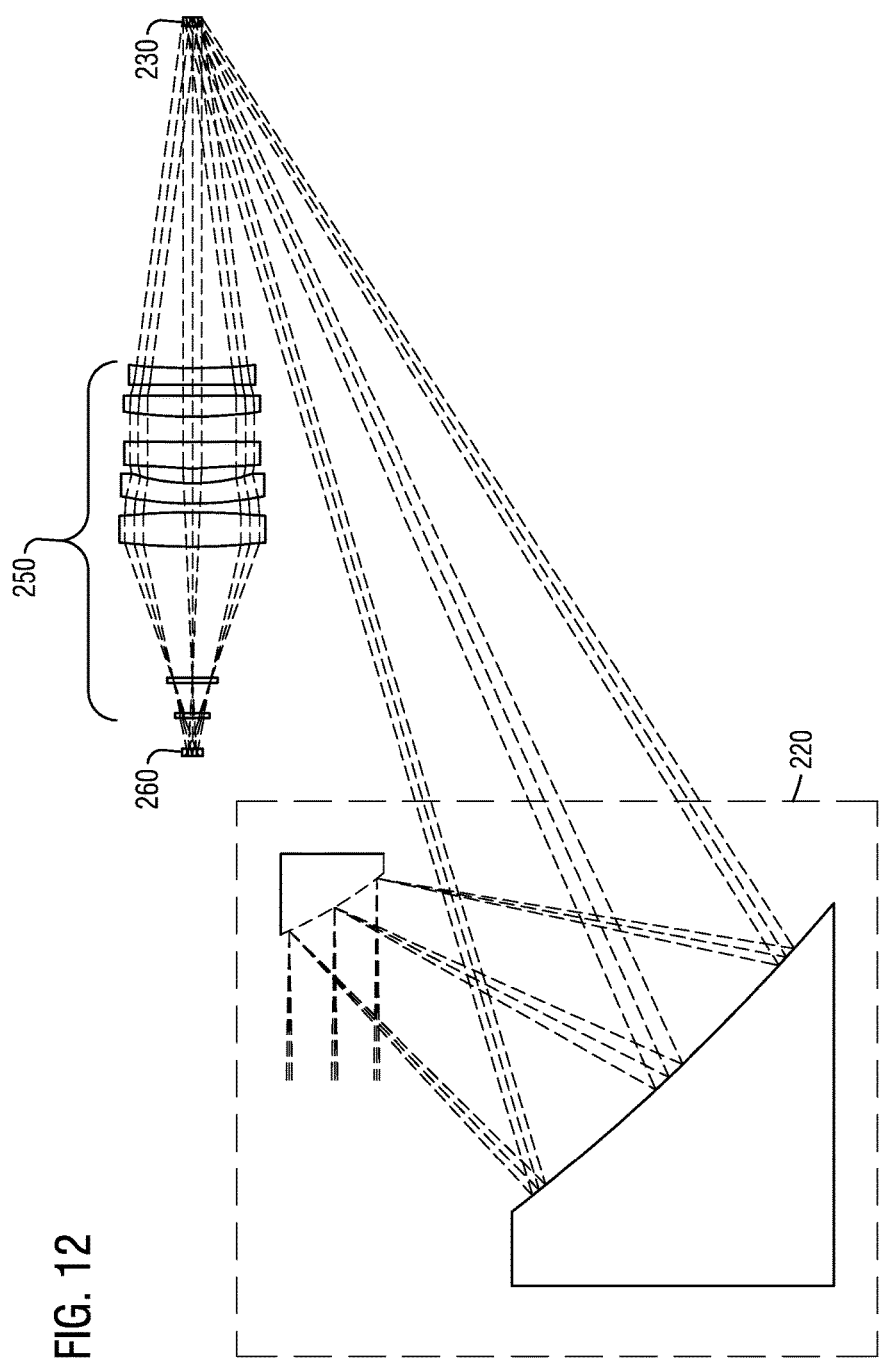
FIG. 12 shows an embodiment using off-axis reflective objective lens.

FIG. 12 illustrates an embodiment using off-axis reflective objective lens. The off-axis reflective optical system is also designed to be telecentric in order to form the image from every point of the object on the DMD mirrors of DMD 230 at an angle of 24 degrees. Thus the objective lens group 220 may be designed as an all-refractive lens design, an all-reflective mirror design, or a combination of both lenses and mirrors.

Embodiments disclosed above may be parallelized to provide for scalability to large images and wide field of views. Single pixel camera and variants do not scale to large area due to computational bottlenecks in the inversion algorithms. Further, embodiments disclosed above provides for the detector or FPA to collect compressive measurements, rather than pixels.

In embodiments disclosed above a programmable variable acuity super-pixel imaging focal plane array, or detector, may be used for compressive sensing. This type of FPA may allow for changing a size of the pixels across the FPA before the data is read-out. This allows for dynamically, or selectively, controlling the number of high resolution points in the input scene that are captured on each detector of the FPA. This, in turn, may provide for electronically varying a compression rate across the scene, and sense different regions of the scene at different resolutions and compression.

Thus, the detector may be considered a taskable infrared sensor system which can adaptively allocate its optic-electronic resources, such as, but not limited to, the DMD mirror elements, number of codes, FPA pixel sizes, etc., to vary the collection of information across the scene, such as, but not limited to, by varying spatial resolution, revisit rate, regions of interest, in response to dynamic contents of the scene. Providing for the taskable sensor is based on its compressive sensing capabilities. Using such a sensor also may provide for a reduction in data bandwidth and an ability to acquire only that information which is useful for performing the task of interest.

Figure 13:
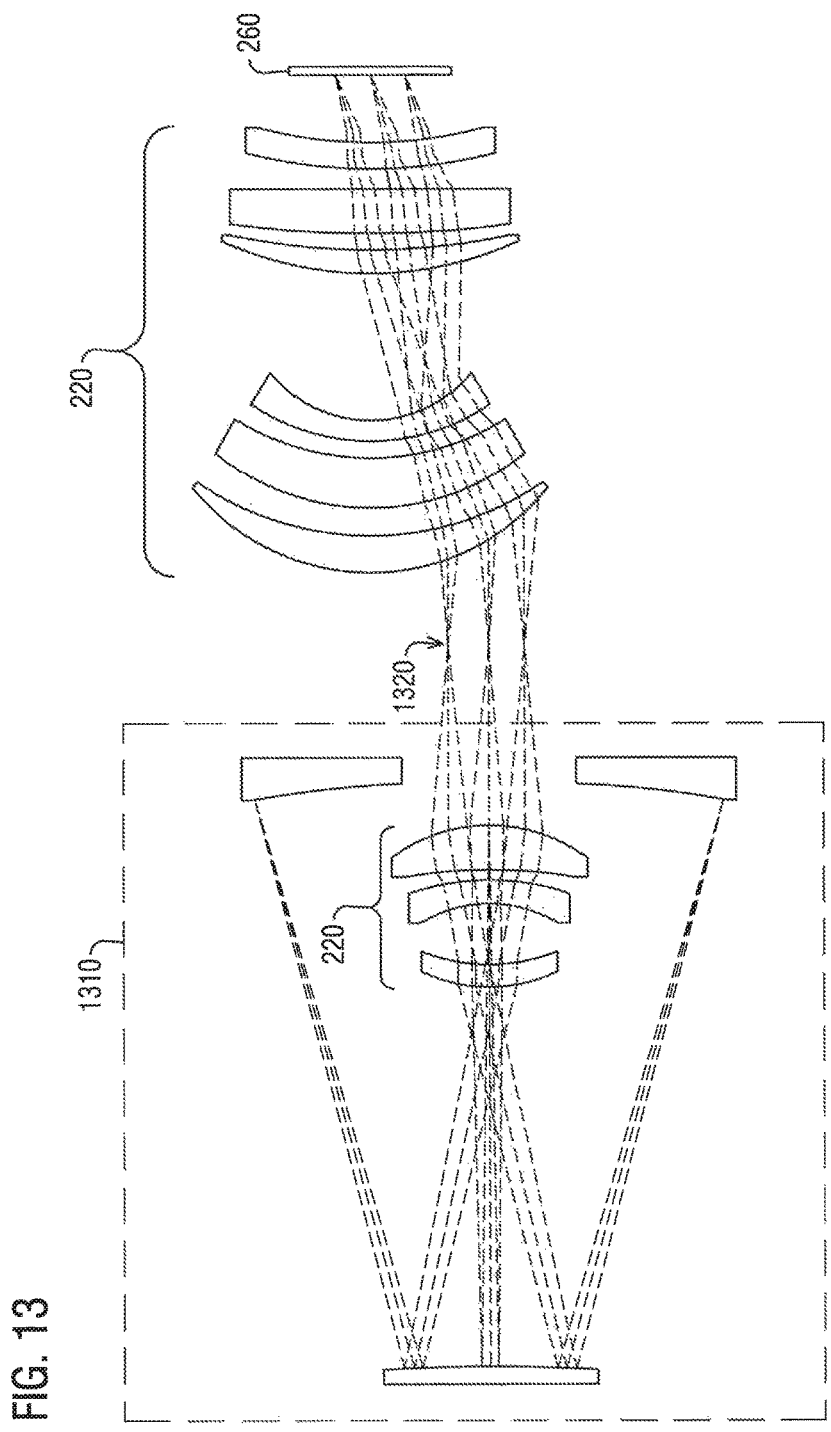
FIG. 13 shows an embodiment of an objective lens with a telescopic aperture.

An external entrance pupil may be further provided in front of objective lens that can be used to interface to a telescope, or microscope, in front of the system to provide a larger system aperture with a smaller field-of-view, or a smaller system aperture with a larger field-of-view. FIG. 13 illustrates the objective lens group 220 of a focal telescope 1310 that interfaces to the objective lens 220 of an embodiment disclosed herein at an external entrance pupil 1320 of the objective lens 220. This embodiment demonstrates that afocal optical systems may be added to the infrared compressive sensing system to increase the aperture size. FIG. 13 also illustrates the use of multiple DMD spatial light modulators to increase the field-of-view of the system.

Figure 14A:
FIGS. 14A-14F shows compressively sensed reconstruction results of both a bar pattern and a face.
Figure 14C:
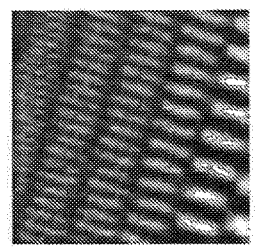
Figure 14E:
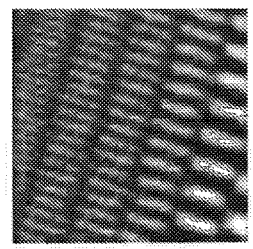
Figure 14B:
Figure 14D:
Figure 14F:

FIGS. 14A-14F show compressively sensed reconstruction results of both a bar pattern and face. FIGS. 14A and 14B illustrate two 23×23 images from the FPA when all the mirrors are turned on. FIGS. 14C and 14D illustrate bi-cubic interpolated versions that are to be compared with the same 128×128 sized compressively sensed reconstructions shown in FIGS. 14E and 14F using the sensor model and algorithms previously described. The images reconstructed with multiple codes have considerably better resolution than the raw data without any codes. In both of these acquisitions, the super pixeling feature of the detector sensor was enabled, where each FPA super pixel of original size 2×2 detects 12×12 mirrors. Individual bars are easily distinguished for at least five of the six rows in the CI reconstruction. Detailed facial features such as eyebrows and contour around the mouth are better resolved too. In these two cases the compression ratio is 1:1.

Persons skilled in the art will recognize that an apparatus, such as a data processing system, including a CPU, memory, I/O, program storage, a connecting bus, and other appropriate components, could be programmed or otherwise designed to facilitate the practice of embodiments of the method. Such a system would include appropriate program means for executing the method. Also, an article of manufacture, such as a pre-recorded disk, computer readable media, or other similar computer program product, for use with a data processing system, could include a storage medium and program means recorded thereon for directing the data processing system to facilitate the practice of the method.

Embodiments may also be described in the general context of computer-executable instructions, such as program modules, being executed by any device such as, but not limited to, a computer, designed to accept data, perform prescribed mathematical and/or logical operations usually at high speed, where results of such operations may or may not be displayed. Generally, program modules include routines, programs, objects, components, data structures, etc., that perform particular tasks or implement particular abstract data types. In an embodiment, the software programs that underlie embodiments can be coded in different programming languages for use with different devices, or platforms. It will be appreciated, however, that the principles that underlie the embodiments can be implemented with other types of computer software technologies as well.

Moreover, those skilled in the art will appreciate that the embodiments may be practiced with other computer system configurations, multiprocessor systems, microprocessor-based or programmable consumer electronics, minicomputers, mainframe computers, and the like. Embodiments may also be practiced in distributed computing environments where tasks are performed by processing devices located at different locations that are linked through at least one communications network. In a distributed computing environment, program modules may be located in both local and remote computer storage media including memory storage devices.

In view of the above, a non-transitory processor readable storage medium is provided. The storage medium comprises an executable computer program product which further comprises a computer software code that, when executed on a processor, causes the processor to perform certain steps or processes. Such steps may include, but are not limited to, applying compressive sensing to control the state of the at least one mirror of the plurality of mirrors of the spatial light modulator reflecting the image through the objective lens onto at least one of the detection array and a Dewar to form the image at the detection array with a resolution greater than the resolution capability of the detection array.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
a detector;
a combination of lenses and mirrors as imaging optics configured to provide for block-by-block compressive sensing of an imaged scene with the block by block determined by a plurality of shift-invariant masks to produce an image of the scene on the detector;
wherein a resolution of the image being reflected through the combination of lenses and mirrors to the detector is greater than a resolution capability of the detector; and,
a cold Dewar, wherein the combination of lenses and mirrors is further configured to operate in at least one of an on-state and an off-state to control reflectivity of at least one mirror of the mirrors so that the at least one mirror, when in the on-state, reflects a segment of the imaged scene to the detector and the at least one mirror, when in the off-state, directs a segment of an image of the cold Dewar onto the detector.

2. A system comprising:
a spatial light modulator ("SLM") configured with a plurality of mirrors;
an objective lens configured to form an image of a scene on the spatial light modulator;
an infrared detector, comprising a detection array, wherein the detection array has a lower resolution capability than a resolution capability of the spatial light modulator; and
a relay lens configured to relay light from SLM to the infrared detector;
wherein the image on the spatial light modulator is optically relayed to the infrared detector; and
wherein the spatial light modulator is further configured to activate the plurality of mirrors of the spatial light modulator, based on a compressive sensing scheme, to at least one of an on-state and an off-state to control reflectivity of at least one mirror of the plurality of mirrors so that the at least one mirror in the on-state reflects a segment of the image to the detection array of the infrared detector and the at least one mirror in the off-state reflects a segment of an image of the cold Dewar onto the infrared detector.

3. The system according to claim 2, wherein the on-state of the at least one mirror of the plurality of mirrors provides for a resolution of the image at the detection array to be greater than the resolution capability of the detection array.

4. The system according to claim 2, further comprising:
a processor; and
a non-transitory processor readable storage medium, providing an executable computer program product, the executable computer program product comprising a computer software code that, when executed on the processor, causes the processor to control the at least one mirror of the plurality of mirrors of the spatial light modulator to perform compressive sensing of the scene to form the image of the scene at the detection array with a resolution greater than the resolution capability of the detection array.

5. The system according to claim 2, wherein the image is optically relayed back through the objective lens.

6. The system according to claim 2, further comprising a relay lens configured to optically relay the image to the detection array of the infrared detector.

7. The system according to claim 2, wherein the SLM is configured to vary segments of the imaged scene collected by the infrared detector.

8. The system according to claim 2, further comprising an external entrance pupil configured to interface with at least one of a telescope and a microscope to provide for at least one of a larger aperture with a smaller field of view and a smaller aperture with a larger field of view.

9. The system according to claim 2, wherein the image is formed on a flat image plane at an angle-of-incidence of approximately 24 degrees to the image plane.

10. The system according to claim 2, wherein the objective lens is configured to have a line-of-sight that is off-centered from an optical centerline of the objective lens by a distance that causes a center of a field of view to focus at an angle of incidence of approximately 24 degrees to a flat image plane.

11. The system according to claim 2, wherein the objective lens is telecentric.

12. The system according to claim 2, wherein the detection array is a focal plane array detector.

13. The system according to claim 2, wherein the spatial light modulator is a digital micromirror device.

14. The system according to claim 2, wherein the detection array of the infrared detector is configured to detect in a midwave infrared spectrum.

15. The system according to claim 14, wherein the spatial light modulator is configured to reflect and the objective lens is configured to transmit in the midwave infrared spectrum.

16. The system according to claim 2, wherein the detection array of the infrared detector is configured to detect in a longwave infrared spectrum.

17. The system according to claim 16, wherein the spatial light modulator is configured to reflect and the objective lens is configured to transmit in the longwave infrared spectrum.

18. A method comprising:
forming an image of a scene onto a spatial light modulator through an objective lens;
activating a plurality of mirrors of the spatial light modulator to control reflectivity of at least one mirror of the plurality of mirrors so that the at least one mirror in an on-state reflects a segment of a plurality of segments of the image of the scene to a detection array of an infrared detector and the at least one mirror in an off-state reflects an image of a cold Dewar onto the detection array of the infrared detector; and
applying a compressive sensing scheme to control states of the plurality of mirrors of the spatial light modulator to form the image of the scene at the detection array with a resolution greater than the resolution capability of the detection array.

* * * * *